Patented Sept. 26, 1939

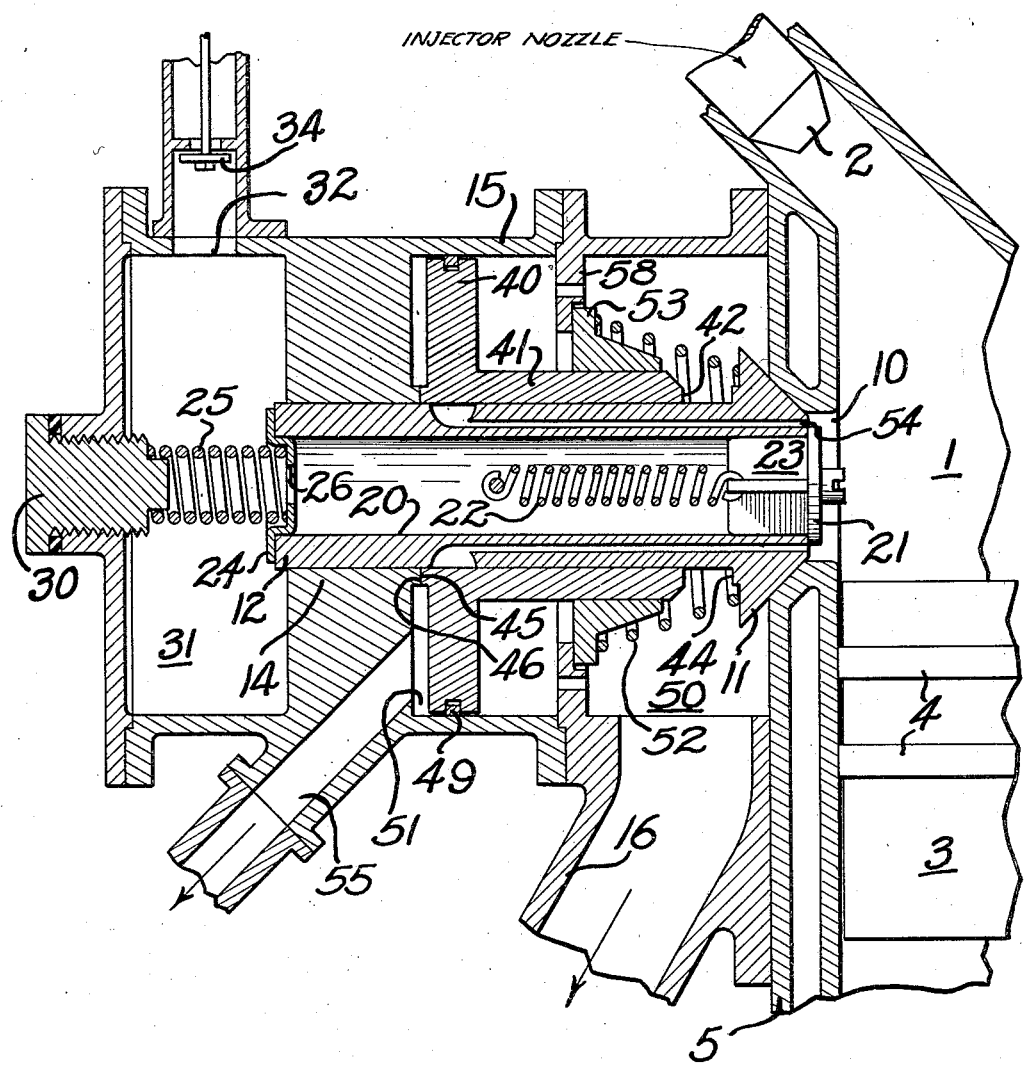

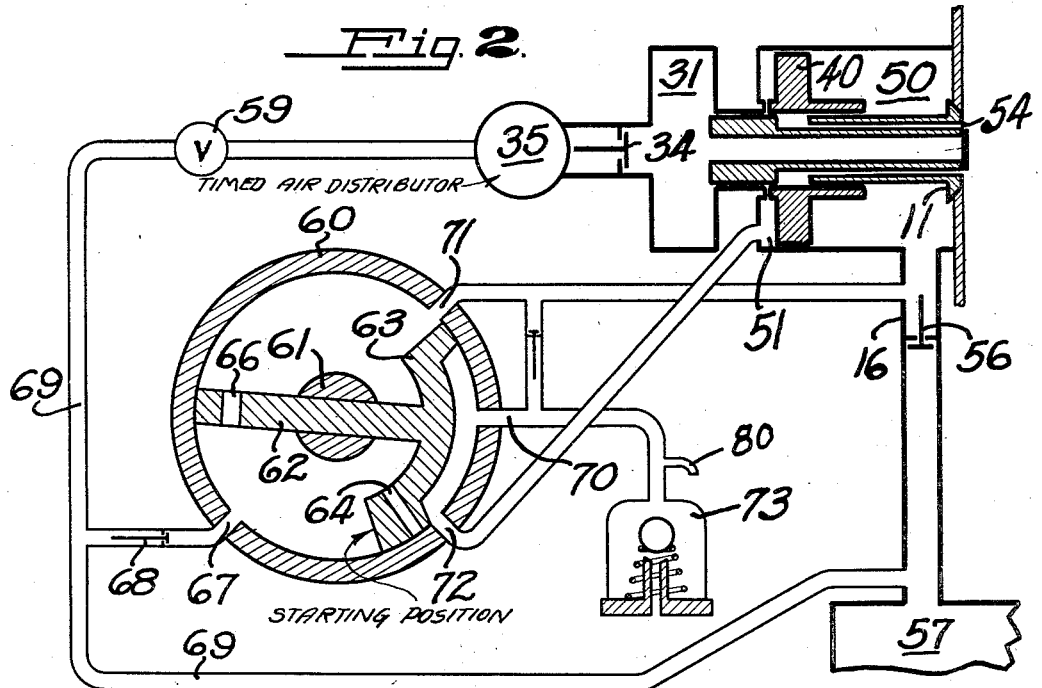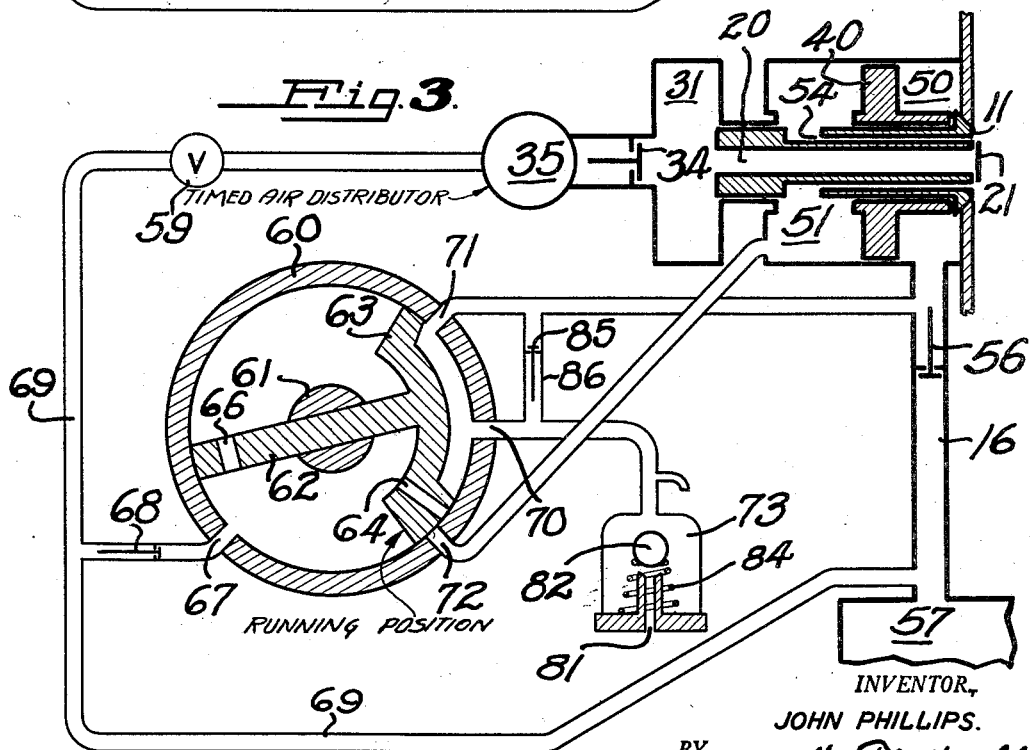

2,173,857

UNITED STATES PATENT OFFICE 2,173,857

CONTROL VALVE AND CONVERTING SYSTEM

John Phillips, Oakland, Calif.

Application September 22, 1937, Serial No. 165,119

8 Claims. (Cl. 60—16)

My invention relates to an automatic air control valve and system for operation thereof, and this valve is particularly adapted for use in conjunction with Diesel or other high compression engines, in order that the engine may be started with air or operated as an air pump, at the option of the engine operator.

Among the objects of my invention are: To provide an automatic air valve for a Diesel engine or the like, utilizing differential pressures for operation thereof; to provide an automatic air valve controllable by differential air pressures; to provide an automatic air valve enabling an engine to operate to furnish power or as an air pump, at the will of the operator; to provide an operating system for use in conjunction with an automatic air valve for air starting and air controlling the output of a Diesel engine; to provide a simple and efficient air starting and compressing system for high compression engines or the like; and to provide a simple and efficient means and method of maintaining an air supply available for starting a Diesel engine or the like.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

While my invention is to be described as being particularly applicable to Diesel engines, it is obvious that it is applicable to any engine where air starting is desirable, and where the engine itself is utilized as an air pump in one or more cylinders thereof.

I also intend to describe my invention as applied to a single cylinder, although it will be obvious that in multi-cylinder engines each cylinder may be equipped with the air valve of my invention, and that any one of them may be utilized and controlled as desired, following the teachings of the present invention.

The broader aspects of my invention may be more fully understood by direct reference to the drawings, wherein:

Fig. 1 is a longitudinal sectional view of the automatic air valve of my invention, with fragmentary details only shown of the engine cylinder to which it may be attached.

Fig. 2 is a diagrammatic representation, with springs omitted, of the valve condition with the engine operating as a starter.

Fig. 3 is a view similar to Fig. 2, showing the valve condition when the engine is being operated to furnish power.

In order that my invention may be more fully understood, I will hereinafter describe the mechanical parts of the valve, and thereafter, by means of diagrams, explain how it is utilized during operation of the engine.

In Fig. 1, an engine cylinder 1, here shown as being of the Diesel type, and supplied with liquid fuel through injector nozzle 2, is provided with the usual piston 3 having rings 4 thereon. The engine cylinder is usually provided with a water jacket 5. In the wall of the cylinder, above the topmost level of the piston in its travel, is an automatic valve port 10 in which is fitted an automatic valve 11. This automatic valve is provided with a long hollow stem 12 operating in a valve bearing 14 supported by valve casing 15. The valve casing is provided with an air outlet pipe 16. The interior bore 20 of the automatic valve opens into the engine cylinder, this opening, however, being covered by check valve 21 maintained in position by check valve spring 22, and guided by a check valve body 23. The far end of the automatic valve stem 12 is provided with a spring retainer 24 into which a valve spring 25 is set, this spring retainer being provided with an air aperture 26. The other end of the valve spring 25 bears against the valve plug 30, this valve plug being removable. Automatic valve bearing 14 extends outwardly, and is prolonged to the rear of the valve to surround a starting air chamber 31, provided with an air inlet 32 in which there is an air inlet check valve 34.

Mounted on the hollow valve stem 12 is a sliding piston 40 having a piston bearing 41 making long contact with the exterior of the valve stem 12. The cylinder end of this piston bearing 41 is provided with a ground face 42 adapted to contact a similar ground face 44 on the back of automatic valve 11. Similarly, the piston 40 is provided at the rear with a ground face 45 cooperating with a similar ground face 46 on the valve stem bearing 14. Thus, the piston at each end of its travel will make tight contact, with the automatic valve at one end, and the piston bearing at the other. The outer periphery of piston 40 is provided with a piston ring 49 bearing on casing walls 15. Thus, the piston divides the casing into two chambers, an air outlet chamber 50 and a control chamber 51. A piston spring 52 is provided, bearing against the automatic valve 11 at one end thereof, and against spring retainer 53 held in place by case ring 58, at the other end thereof. This spring 52, as well as spring 25, operates to close the valve 11 when piston 40 is in a rear position.

The side walls of hollow valve stem 12 are drilled with a plurality of pressure bores 54 opening at the front of the valve into the cylinder 1, and at the rear at a point on the valve stem 12 where the rear opening will be covered by the piston 40 at its more rearward position, but will be uncovered when the piston is moved forward toward the cylinder. Control chamber 51 is provided with a control outlet 55.

In order to operate the automatic valve, air outlet conduit 16 is connected through an air outlet check valve 56 to a main air tank 57. Air inlet chamber 31 receives air through air inlet check valve 34 from an air distributor 35, represented diagrammatically only in Figs. 2 and 3. The starting air is under control of starting valve 59. A special control valve is provided for operating the automatic valve. This control valve is shown diagrammatically in Figs. 2 and 3, and comprises a cylindrical casing 60 having a central operating axle 61. This axle is split, and rotates a control valve 62 having a U-shaped peripheral portion 63 bearing on the cylindrical wall 60, thus providing a chamber between the two legs of the U. One of the legs of the U-shaped portion is provided with an air vent 64, and the diametrical portion 62 of the valve is provided with a port 66 so that air in back of the valve may be equalized.

There are four ports in the cylindrical wall 60; three of the ports being closely adjacent and cooperating with the U-shaped valve portion 63, and the remaining port being wholly a pressure port 67, connected through an inlet check 68 to starting air line 69, which comes directly from tank 57 and goes also to starting valve 59. The center port 70 of the group ports opens to atmosphere through a bleeder 73, the upper port 71 leads to air outlet 16, and the lower port 72 leads to control chamber 51.

As far as the operation of the valve is concerned, one function of air pressure port 67 is to place air pressure back of the U-shaped portion 63 in order that good contact may be made between the legs of the U-shaped portion and the cylinder wall.

In Figs. 2 and 3, two positions of the control valve, and therefore of the automatic valve, are shown, and I shall first describe the pumping position shown in Fig. 2, where the valve is set to allow the engine cylinder to pump air into tank 57. This is done, in multi-cylinder engines, by cutting off fuel to cylinder 1 only.

If the figure be examined, it will be seen that the control chamber 51 is open to atmosphere through lower port 72, through the space between the legs of the U-shaped valve 63, through center port 70, and bleeder 73. Tank pressure acting upon piston 40 through the control valve and upper port 71, forces the piston firmly to the rear. At the same time, any air pressure entering control chamber 51 through the bores 54 is bled to atmosphere, and when the piston reaches the rearmost position, the bores 54 will be closed by the piston 40 sliding over them. Under these conditions, the cylinder 1 and engine piston 3 will act as an air pump, pumping air into tank 57, the air pressure in the engine cylinder operating at the top of the stroke to open the automatic valve 11 against springs 52 and 25 to give proper pumping control. It should be noticed that in addition to the seal of the bores 54 at their inner ends by the piston, that ground surfaces 45 and 46 cooperate to provide an additional seal in case of wear.

Let us consider now the control valve condition which exists when the engine is running, or which exists when the engine is to be started by air. Obviously, it will not do to allow the automatic valve 11 to open at any point in the cycle, either during air starting or during operation of the engine. In order to lock the automatic valve, the control valve is rotated into the running position shown in Fig. 3. It will be noticed that this rotation makes no change in the back of the valve, air pressure from line 69 being still applied back of the U-shaped portion, thus forming the seal. The rotation of the control valve to the new position opens the automatic valve chamber 50 to the atmosphere through upper port 71, through the space between the legs of the U-shaped portion of the valve to atmosphere, through center port 70, and bleeder 73.

In the meantime, lower port 72 has been sealed by one leg of the U-shaped portion. However, during the passage of the control valve from one position to the other, air vent 64 has passed across the opening of control line 72, thus admitting air under pressure from tank 57 back of piston 40, forcing it to the front position because chamber 50 is vented to atmosphere, check valve 56 keeping out tank pressure. Thus, the pressure back of the piston forces it forward until the end of piston bearing 41 engages the automatic valve 11, and ground faces 42 and 44 come in contact.

As soon as any pressure is built up in cylinder 1, either from the starting air or from an explosion in the engine, this pressure will pass through bores 54 and build up back of the piston, inasmuch as the piston, in its forward travel, has uncovered the end of these bores. As the area of the piston 40 is far greater than the area of the automatic valve 11 exposed to the cylinder, and the pressures are the same, automatic valve 11 is locked completely shut irrespective of the pressures in the cylinder, due to the different areas exposed to the same pressure.

When it is desired to start the engine with air, the control valve is thrown to the running position of the automatic valve, as shown in Fig. 3, and then starting air valve 59 is opened through air distributor 35 and air is admitted to starting air chamber 31. It then passes through the hollow bore 20 of the automatic valve, opens check valve 21, and passes into the cylinder 1. The pressure of this air is then transferred to the back of the piston and holds the piston against the valve to lock it, and as soon as explosions occur in the cylinder, pressure back of the piston is maintained until the control valve is turned to a position where the chamber 51 again is vented to atmosphere. It should be noted in this respect that the air pressure is applied to lower port 72 as it is being moved from the locking position shown in Fig. 3 to the unlocking position in Fig. 2. However, this pressure simply serves to hold the piston in locking position up to the very instant that control line 72 is vented to the atmosphere.

The above described operations will serve to control the automatic valve when there is air in tank 57. One other condition must be taken into account, however, and that condition is when there is no air in tank 57 or any pipe line, and it is desired to start the engine by cranking. Under these circumstances, the piston 40 may be in one of two positions, namely, to the rear, as shown in Fig. 2, or in front, as shown in Fig. 3.

If the piston 40 is in the front position, as shown in Fig. 3, and the control valve in the position shown in Fig. 3, then there will be no difficulty in starting the engine by cranking, because the first upstroke of the engine piston will cause air pressure to enter bores 54 and build up a pressure in chamber 51 because lower port 72 is blocked by the control valve. Thus, the engine will readily start, and the automatic valve 11 will not open.

After the engine is once running, with the control valve in the position shown in Fig. 3, and it becomes desirable to pump up tank 57, it will be necessary to move the piston to the rear in order to free the automatic valve 11 and allow the use of the engine cylinder as an air pump. In order to do this the control valve is moved back into the position shown in Fig. 2. Under these circumstances, during rotation of valve 62 pressure from the engine cylinder will enter bores 54 and chamber 51. This pressure will pass through lower port 72 and out through the central port 70 into the bleeder 73.

Bleeder 73 comprises a small atmospheric port 80 and a large atmospheric port 81. Immediately over the large atmospheric port I position a port ball 82, supported by ball spring 84 immediately above port 81. Thus, when air under pressure enters the bleeder 73 in a greater amount than can be passed over to the atmosphere through the small atmospheric port 80, this additional air will tend to rush out of large atmospheric port 81. The velocity of the air at this point causes ball 82 to close the large atmospheric port 81, and inasmuch as the small atmospheric port 80 cannot handle all the air, by-pass check valve 85, positioned in a by-pass 86 between the central port 70 and the upper port 71, will open, thus charging chamber 50 above air check 56, and this charge will continue until pressures on both sides of the piston approach equalization, whereupon the pressure exerted by the piston 40 against valve 11 is reduced to a point where the valve 11 may open and allow air to pass directly from the engine cylinder into chamber 50. This valve opening, being much larger than the size of bores 54, immediately allows the charging of tank 57 and as the pressure builds up in chamber 50, the piston is moved to the rear, closing off bores 54, and the pressure in chamber 51 thereupon bleeds out the small atmospheric port 80 and the ball 82 moves under the influence of spring 84 to reopen large atmospheric port 81.

In case the piston 41 is in the rear position, with no air in the tank or pipe lines, and it is to be hand cranked, the control valve is placed in pumping position as shown in Fig. 2. The first stroke of the engine piston will charge chamber 50, tank 57, and the control valve through upper port 71. The control valve is then moved to the running position of Fig. 3 and the pressure will bleed out of chamber 50, and control valve pressure will enter back of piston 40 when vent 64 passes over lower port 72 when the control valve is moved. The piston moves to locking position, and the engine is then ready for starting when again cranked. Inasmuch as there are no springs or other clamping factors other than differential air pressures acting on piston 40, it moves easily and quickly with very low differential pressures.

Thus I have provided a relatively simple structure and control valve therefor, operating by means of differential pressures which may be controlled simply by control of an air valve to allow the automatic valve to act as an air pump valve, or to lock it solidly in position while the engine is running. I have thus eliminated complicated mechanical valve shifting and valve locking mechanism, and have obtained thereby a valve which is locked by cylinder pressure and thus maintained in locking position irrespective of how high the pressures in the cylinder rise.

I claim:

1. An air control mechanism for an internal combustion engine having a ported combustion chamber, comprising a valve adapted to form a tight seal with said ported chamber, a cylindrical valve body extending from said valve, a closed cylinder concentric with said valve body and forming a piston chamber therearound, a piston free to move within said chamber and bearing against both said valve body and the inner wall of said piston chamber, the area of said piston being greater than the area of said valve exposed to said combustion chamber, an air source, and means for controlling air pressure from said source in said piston chamber back of said piston to force said piston against said valve to lock said valve against combustion pressures and to return said piston to an unlocking position.

2. Apparatus as recited in claim 1, wherein a conduit is provided in said valve body connecting said conduit with that portion of said piston chamber back of said piston when said piston is in valve locking position.

3. Apparatus as recited in claim 1, wherein a conduit is provided in said valve body connecting said conduit with that portion of said piston chamber back of said piston when said piston is in valve locking position, and wherein the end of said conduit opening into said latter portion is covered by said piston when said piston is at the other end of said piston chamber.

4. Apparatus as recited in claim 1, wherein an air outlet port is provided in said piston chamber between said piston and said valve.

5. Means associated with a Diesel engine combustion chamber for determining operation thereof as prime mover, compressed air starting chamber, and air compressor, comprising a compressed air source, a valve port in said combustion chamber and a valve adapted to form a tight closure with said port, resilient means for maintaining said valve normally closed, said valve having a centrally disposed bore, a check valve normally closing said bore against positive pressure within said combustion chamber; means, including a piston slidably disposed about said valve, operable by air pressure for locking said valve when pressure is applied in one direction, and for permitting said valve to open under combustion chamber pressure when air pressure is applied to said piston in the opposite direction, and a control valve adapted to determine the direction of application of compressed air to said piston.

6. An air control mechanism for an internal combustion engine having a ported combustion chamber, comprising a valve adapted to form a tight seal with said ported chamber, a cylindrical valve body extending from said valve, an aperture centrally disposed through said valve, a check valve positioned to close said aperture under positive combustion chamber pressure, a piston slidably disposed about said valve, a cylinder concentric about said piston and adapted to form a tight sliding fit therewith, a source of compressed air, and means including a two-position control valve adapted in one of said positions to direct compressed air through said centrally apertured valve and check valve into said combustion chamber, and in the other of said positions to lock said valve against positive combustion chamber pressure.

7. In combination with a Diesel engine cylinder, a control valve mechanism arranged to permit functioning of said cylinder for compressed air starting, for air compressing, and for action as a prime mover, comprising a source of compressed air, an auxiliary cylinder disposed adjacent said engine cylinder, an auxiliary piston slidably positioned within said auxiliary cylnder, a hollow cylindrical valve body slidably positioned within said auxiliary piston, a port between said auxiliary cylinder and said engine cylinder alined with said cylindrical valve body, a valve formed upon said valve body shaped to engage with and seal said port, a central aperture extending through said valve body, a check valve adapted to close said aperture against positive pressure within said engine cylinder, pressure ducts arranged through said valve body from said Diesel engine cylinder to the rear of said auxiliary piston when said piston is in forward position, said piston being adapted to close said ducts when in rearward position, and a control valve adapted to direct air under pressure from said compressed air source against said auxiliary piston whereby said piston may be maintained in a certain position, said auxiliary piston being adapted to lock said valve in said port in its forward position, and to permit said valve to open in its rearward position.

8. In combination with an internal combustion engine cylinder, a control valve comprising an auxiliary cylinder body having two chambers therein, a central partition therebetween slidably supporting a hollow cylindrical valve body, one of said chambers being adjacent said engine cylinder, a frustoconical segment formed upon the end of said valve body nearest said engine cylinder, a port disposed through the wall of said engine cylinder in registry with said frustoconical segment, a check valve closing the hollow portion of said valve body against positive engine cylinder pressures, resilient means disposed at the end of said valve body opposite said frustoconical segment for maintaining said segment sealed against said port, an inlet port to the auxiliary cylinder body chamber farthest from said engine cylinder, two ports into the nearest to the engine cylinder of said body chambers, one being disposed adjacent said engine cylinder, and the other being formed near the said central partition, air passages formed in the walls of said valve body extending from the frustoconical segment to near said central partition, said passages being open to the engine cylinder and the auxiliary cylinder body chamber nearest thereto, a piston slidably disposed about said valve body within said last mentioned chamber and arranged to contact and form a tight seal with said frustoconical segment in forward position and to close said air passages and form a seal with said central partition in its rearward position, and resilient means for maintaining said piston normally in rearward position.

JOHN PHILLIPS.